United States Patent [19]

Hayes

[11] Patent Number: 5,032,149

[45] Date of Patent: Jul. 16, 1991

[54] SURFACTANT TREATMENT OF POLYARAMIDE GAS SEPARATION MEMBRANES

[75] Inventor: Richard A. Hayes, Parkersburg, W. Va.

[73] Assignee: E. I. du Pont de Nemours and Company, Wilmington, Del.

[21] Appl. No.: 418,831

[22] Filed: Oct. 10, 1989

[51] Int. Cl.$^5$ .................... B01D 53/22; B01D 71/56
[52] U.S. Cl. ......................... 055/016; 055/068; 055/158
[58] Field of Search ..................... 55/16, 68, 158

[56] References Cited

U.S. PATENT DOCUMENTS

| | | | |
|---|---|---|---|
| Re. 30,351 | 7/1980 | Hoehn et al. | 55/158 X |
| 3,325,330 | 6/1967 | Robb | 156/229 |
| 3,874,986 | 4/1975 | Browall et al. | 161/160 |
| 3,980,456 | 9/1976 | Browall | 55/158 |
| 4,080,743 | 3/1978 | Manos | 55/16 X |
| 4,080,744 | 3/1978 | Manos | 55/16 X |
| 4,120,098 | 10/1978 | Manos | 55/16 X |
| 4,230,463 | 10/1980 | Henis et al. | 55/68 X |
| 4,472,175 | 9/1984 | Malon et al. | 55/158 X |
| 4,484,935 | 11/1984 | Zampini | 55/158 |
| 4,486,202 | 12/1984 | Malon et al. | 55/158 |
| 4,486,376 | 12/1984 | Makino | 264/342 |
| 4,512,893 | 4/1985 | Makino | 210/500.2 |
| 4,512,894 | 4/1985 | Wang | 210/500.2 |
| 4,527,999 | 7/1985 | Lee | 55/16 |
| 4,554,076 | 11/1985 | Speaker | 210/639 |
| 4,606,740 | 8/1986 | Kulprathipanja | 55/158 X |
| 4,654,055 | 3/1987 | Malon et al. | 55/158 |
| 4,705,540 | 11/1987 | Hayes | 55/158 X |
| 4,715,960 | 12/1987 | Thompson | 210/651 |
| 4,717,394 | 1/1988 | Hayes | 55/16 |
| 4,728,346 | 3/1988 | Murphy | 55/158 |
| 4,859,215 | 8/1989 | Langsam et al. | 55/158 X |
| 4,863,496 | 9/1989 | Ekiner et al. | 55/16 X |
| 4,871,461 | 10/1989 | Karakane et al. | 55/16 X |
| 4,877,421 | 10/1989 | Bikson et al. | 55/16 |
| 4,883,593 | 11/1989 | Friesen et al. | 55/158 X |

FOREIGN PATENT DOCUMENTS

| | | | |
|---|---|---|---|
| 0107636 | 9/1983 | European Pat. Off. | |
| 0179474 | 4/1986 | European Pat. Off. | 55/158 |
| 0219878 | 4/1987 | European Pat. Off. | 55/158 |
| 59-216603 | 12/1984 | Japan | 55/158 |
| 62-294419 | 12/1987 | Japan | 55/158 |
| 63-151333 | 6/1988 | Japan | 55/158 |
| 61-080419 | 3/1989 | Japan | 55/158 |
| 01-123617 | 5/1989 | Japan | 55/158 |
| 01-123618 | 5/1989 | Japan | 55/158 |

OTHER PUBLICATIONS

Cabasso et al., "Research and Development of NS. 1 and Related Polysulfone Hollow Fibers for Reverse Osmosis Desalination of Seawater", (NTIS PB. 248666, 7/1975).

*Primary Examiner*—Robert Spitzer
*Attorney, Agent, or Firm*—Craig H. Evans

[57] ABSTRACT

A process for improving the permselectivity of asymmetric polyaramide gas separation membranes is disclosed. The process involves contacting the membrane with a dilute solution of a surfactant in a solvent which preferably swells the membrane material. The surfactants are anionic, nonionic or amphoteric with the fluorinated nonionic surfactants being preferred.

10 Claims, No Drawings

5,032,149

SURFACTANT TREATMENT OF POLYARAMIDE GAS SEPARATION MEMBRANES

FIELD OF THE INVENTION

The present invention relates to polyaramide permselective gas separation membranes and a treatment for such membranes to improve their permselectivity with respect to at least one pair of gases in a multicomponent gas mixture. The treatment involves applying a surfactant dissolved in a liquid non-solvent for the polyaramide forming the permselective gas separation membrane which liquid non-solvent is capable of swelling said polyaramide forming the permselective gas separation membrane.

PRIOR ART

U.S. Pat. No. 4,472,175 discloses asymmetric gas separation membranes which have been treated on one or both surfaces with a Bronsted-Lowry acid to improve the permeation selectivity of the membrane for at least one gas of a gaseous mixture.

U.S. Pat. No. 4,554,076 discloses a method for improving the separatory properties of membranes by depositing on the surface of such membrane of a fluorinated amphiphilic compound in an oriented Langmuir-Blodgett layer to increase membrane selectivity. The patent is primarily directed to liquid-liquid separations, but gases are mentioned.

U.S. Pat. No. 4,654,055 discloses asymmetric gas separation membranes which have been treated on one or both surfaces with a Bronsted-Lowry base to improve the permeation selectivity of the membrane for at least one gas of a gaseous mixture.

EPO - 0,179,474 discloses treating various polymeric gas separation membranes with a dilute solution of a cationic surfactant in a volatile non-polar organic solvent to improve the selectivity of the membrane with respect to separating two gases selected from the group consisting of $CO_2$, $CH_4$ and He.

SUMMARY OF THE INVENTION

Gas separation membranes desirably have a high permeability to gases. This means that the effective portion of the membrane should be as thin as possible. Making the membrane as thin as possible necessarily leads to the membrane containing imperfections or defects. These defects pass gases indiscriminately thus reducing the selectivity of the membrane. The present invention relates to a process for healing these defects to provide a polyaramide membrane having improved permselectivity with respect to at least one gas in a gaseous mixture by treatment with a dilute solution of a surfactant.

DETAILED DESCRIPTION OF THE INVENTION

Most commercial polyaramide gas separation membranes are asymmetric in nature. They are made by casting a film or extruding a hollow fiber from a solution of a polyaramide in a solvent mixture, evaporating a portion of the solvent from one side of the film or the outside of the hollow fiber and quenching in a nonsolvent. The resulting asymmetric polyaramide membrane is characterized by a thin skin of polyaramide supported by a generally cellular structure. This provides a membrane having a thin effective separation member, which results in a high flux or permeation rate to gases, which is highly desirable. However, this effort to form a highly permeable membrane also leads to the formation of submicroscopic defects which pass gases indiscriminately causing the membrane to have an effective separation value for most pairs of gases which is less than the intrinsic separation value of the polymer from which the membrane is made.

The range of defects (size and number), which protrude through the dense separating layer of a membrane can be estimated by the selectivity of one gas over another gas for at least one pair of gases permeating through the membrane. The difference between the intrinsic separation factor for a material and the separation factor for a membrane prepared from that material can be compared to determine range of defects. Thus, the preferred-membrane starting materials have a selectivity ratio of about 2 to 30 for the pair of gases helium and nitrogen. Generally the observed selectivity ratio of the membranes treated in accordance with the present invention will be substantially enhanced. For example, for the gas pair helium/nitrogen, the observed selectivity should essentially double after the treatment described in the present invention. Preferably, the observed selectivity ratio of the membranes treated in accordance with the present invention will be enhanced from ten- to three hundred-fold for the gas pair helium/nitrogen.

The selectivity of one gas over another in multicomponent mixture by permeation through a gas separation membrane is controlled, in part, by the molecular free volume in the dense separating layer of the membrane. To obtain the intrinsic gas selectivity of a membrane, a perfect, defect-free, dense separating layer must be formed during the membrane formation process. The integrity of this separating layer must be maintained throughout the gas separation module to retain a high gas membrane selectivity. This idealized defect-free membrane separating layer could be prepared by increasing the thickness of the layer. In so doing, defects would not be able to protrude through the separating layer. However, this results in a reduction of the gas permeation rate through the membrane, which is not desirable.

In the past, these membrane defects have been sealed to improve gas separations membrane performance. One approach has been to treat the membrane with a swelling agent. The swelling agent may comprise a single component or a multicomponent mixture, such as solvent-nonsolvent mixtures. It is believed that the outer layers of the swollen membrane compact upon drying to yield the observed improvement to the membrane selectivity. Recent examples of such processes include Makino in U.S. Pat. No. 4,486,376; Makino in U.S. Pat. No. 4,512,893; Wang in U.S. Pat. No. 4,512,894; Lee in U.S. 4,527,999; and Thompson in U.S. Pat. No. 4,715,960. Membrane materials may vary greatly in their intrinsic parameters. What may constitute a swelling agent for one material may be a solvent or an inert substance to another material. Examples of this are shown in the before-mentioned prior art. Further, certain swelling agents may be effective only for specific polymers or for certain types of defects.

Another approach to healing such defects in gas separation membranes has been to superimpose two layers on top of each other. For example, Robb, in U.S. Pat. No. 3,325,330, teaches that a multicomponent gas membrane prepared from two dense separating layers laminated together is unlikely to have defects because defects in one dense layer are probably not going to align with defects in the other. Browall et al, in U.S. Pat. No. 3,874,986 and U.S. Pat. No. 3,980,456, extend these teachings to include multicomponent gas membranes comprising a laminate between an asymmetric membrane and a dense film. These teachings have been further extended to include multicomponent gas membranes prepared by coating an asymmetric membrane with a solution which upon drying and curing forms a dense polymeric layer (U.S. Pat. No. 4,230,463).

The teachings of the prior art suffer from not taking into account long-term performance of gas membranes. Commercial gas separation membranes preferably retain high performance levels throughout long operational lifetimes of five years or greater. Generally gas membranes, however, will undergo severe environmental stresses such as short membrane contacts with liquids and/or physical shocks during the operational lifetime. The suitability of a membrane depends on the asymmetric membrane itself, the material of the sealing treatment, and the adhesion between the sealant and membrane not being affected by such environmental stresses throughout the operational lifetime of the membrane.

EPO 0,107,636 teaches that the sealed multicomponent gas membrane compositions exemplified in U.S. Pat. No. 4,230,463 suffer from catastrophic membrane performance losses when contacted with low molecular weight fluids, an expected environmental concern during typical gas separation membrane operation. It is believed that these performance declines are due to the adhesion losses between the asymmetric membrane and the sealing coating. The resulting delamination of the sealing coating and the asymmetric membrane reopens the defects in the dense separating layer of the asymmetric membrane. The prior art has not heretofore considered potential performance losses from environmental physical shocks to the gas membrane. Such environmental physical shocks could occur, for example, during the transport of gas membrane modules, installation of gas membrane modules or as a result of uncontrolled transmembrane-gas-pressure cycling typical of gas membrane operation. Environmental physical shocks would also severely test the adhesion between the sealing treatment and the asymmetric membranes of the multicomponent gas membranes disclosed in the prior art.

U.S. Pat. No. 3,980,456 discloses the use of a preformed organopolysilaxane-polycarbonate copolymer sealing material. The polymeric sealing materials used previously cannot effectively intrude into pores to plug them and are, therefore, only effective by applying a thin coating on top of the membrane material. This causes a substantial loss in membrane productivity. Henis and Tripodi in U.S. Pat. No. Pat. No. 4,230,463, teach that membrane sealing materials are only effective if their molecular size is large enough not to be drawn through the pores of the porous separation membrane during coating and/or separation operations (U.S. Pat. No. 4,230,463, col. 19, line 25–32, line 51–56). Further, they teach that when poly(siloxanes) are used as the membrane sealing material, the polysiloxane molecular weight must be higher than about 1,000 (U.S. Pat. No. 4,230,463; col. 20, line 23–27).

EPO 0,107,636 attempts to correct environmental degradation concerns, but still suffers from applying a coating of polysiloxane diols with molecular weights greater than 10,000.

The present invention circumvents the above shortcomings and provides high performance gas separation membranes which are resistant to severe environmental stresses.

The intimate mechanistic details of this procedure are not well understood. They may vary for different material compositions. It is clear that the procedure reduces the effects that membrane defects and imperfections have on the gas-pair selectively.

The synergistic effects of the surfactant and the swelling agent serve to effectively seal a broad variety of membrane types which incorporate a wider distribution of pore and defect sizes than is found in the prior art. The membrane treated by the process of this invention does not suffer from the end-use environmentally-induced delamination of the prior art.

The process of the present invention effects greater selectivity for gas separations membranes used among other things in recovery of hydrogen in refinery and ammonia plants; separation of carbon monoxide from hydrogen in syngas systems; separation of carbon dioxide or hydrogen sulfide from hydrocarbons; and enrichment of oxygen and nitrogen from air for increased combustion or inerting streams.

The process of the present invention entails contacting a gas separation membrane with a nonsolvent mixture containing a surfactant followed by drying. The gas separation membrane healing technology of the present invention is particularly useful for aromatic polyamide membranes. The procedure of the present invention will find utility for many membrane morphologies, such as asymmetric or composite membranes, particularly asymmetric.

The preferred membranes are asymmetric membranes made from aromatic polyamide materials. These aromatic polyamides may be prepared by typical procedures as taught in the prior art, such as U.S. Pat. No. Re 30,351. More preferably, the aromatic polyamide compositions incorporate pendant aliphatic side chains. Examples of such compositions are disclosed in, for example, EPO 219,878.

The preferred aromatic polyamides useful in the present invention have the formula:

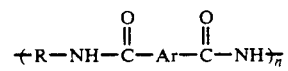

where —R— is

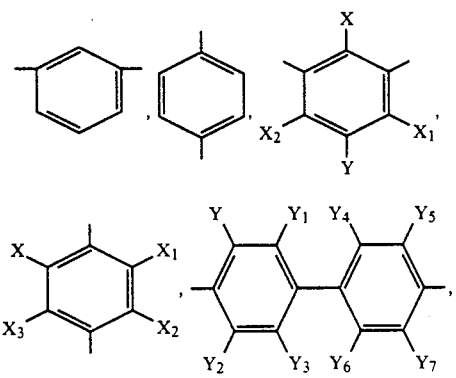

-continued

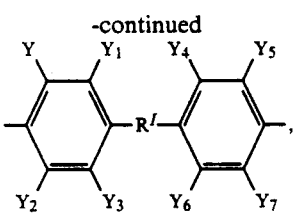

where $-R^I-$ is $-O-$, $-S-$, $-\underset{\underset{O}{\|}}{\overset{O}{\|}}S-$, $-SO_2-$, $-\underset{\|}{\overset{O}{\|}}C-$,

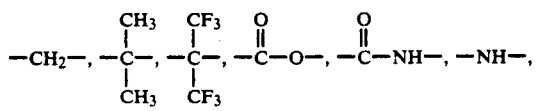

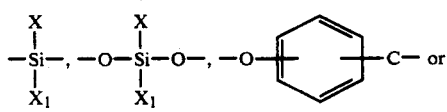

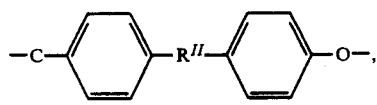

where $-R^{II}-$ is $-O-$, $-S-$, $-\underset{\underset{O}{\|}}{\overset{O}{\|}}S-$, $-SO_2-$, $-\underset{\|}{\overset{O}{\|}}C-$,

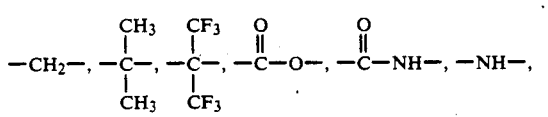

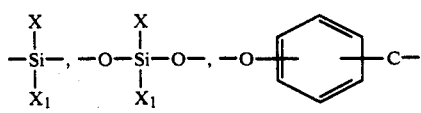

or mixtures thereof; $-Ar-$ is

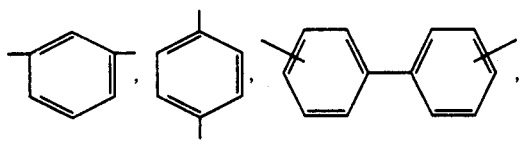

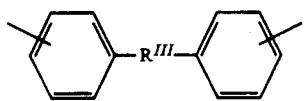

where $-R^{III}-$ is $-O-$, $-S-$, $-\underset{\underset{O}{\|}}{\overset{O}{\|}}S-$, $-SO_2-$, $-\underset{\|}{\overset{O}{\|}}C-$,

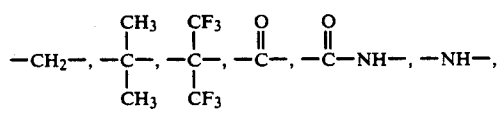

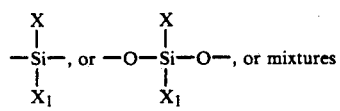

thereof, n is an integer such that the polymer is of film forming molecular weight, $-X$, $-X_1$, $-X_2$, $-X$ and $-X_3$ are independently alkyl groups of 1 to 6 carbon atoms and $-Y$, $-Y_1$, $-Y_2$, $-Y_3$, $-Y_4$, $-Y_5$, $-Y_6$ and $-Y_7$, independently are $-X$ or $-H$.

The gas separations membrane is not limited to any specific type or design. The membrane is preferably in the form of a hollow fiber. The polymeric membrane may be formed as described in the prior art. For example, they may be of the type described in U.S. Pat. No. 4,230,463 or in Cabasso et al in "Research and Development of NS-1 and Related Polysulfone Hollow Fibers for Reverse Osmosis Desalination of Seawater" (NTIS PB-248666, 7/1975).

In the preferred embodiment of the present invention, a gas separation membrane is contacted with a non-solvent mixture containing a surfactant. The membrane is then dried.

The nonsolvent mixture is defined as being incapable of dissolving greater than 3% by weight of the membrane material. Examples of such mixtures may include those which do not interact with the material compositions of the membrane, swelling agents for the membrane material, mixtures of the above, or mixtures of the above which incorporate a solvent for the membrane material. Preferably the nonsolvent mixture will comprise a swelling agent for the membrane material. Such a swelling agent may be composed of a single component or be a multicomponent mixture incorporating non-interacting substances and/or solvents for the membrane material. Specific nonsolvent mixtures will be dependent on the solvent parameters of the membrane material and the membrane morphology. In practical terms, a swelling agent for a certain membrane may be defined as a substance which modifies the membrane's gas permeation properties through contact. Preferably, membrane treatment with said swelling agent as described herein gives at least a 5% improvement in the selectivity of helium over nitrogen. More preferably, said selectivity enhancement is 10% or greater.

Preferably, the non-solvent mixture contains 0.005 to 1.0 weight percent of an effective surfactant. Surfactants effective in the herein described procedure may include anionic, neutral nonionic or amphoteric types. They may be aliphatic, aromatic, or fluorinated. The fluoroaliphatic polymeric esters are particularly useful. These surfactants generally contain from 6 to 50 carbon atoms. Said surfactants are to be incorporated in an effective amount. This effective amount will vary broadly based on the chemical nature of the surfactant, on the nature of the nonsolvent mixture, on the chemical nature of the membrane material, and on the morphology of the membrane to be treated. Preferably, membranes treated with an effective amount of surfactant, as described herein, will demonstrate at least a 10% enhancement in the selectivity of helium over nitrogen gas when compared to an identical membrane treated with the same nonsolvent mixture which does not incorporate said surfactant.

Referential Example

This referential example describes the material and processes by which asymmetric hollow fiber aromatic polyamide gas separation membranes were produced. The hollow fiber membranes are spun from a hollow fiber spinnerette into a water coagulant as has been taught in the prior art.

A polymer solution was prepared with 27%±1% (weight) solids content of the 50:50 (weight) blend of the aromatic copolyamide prepared by polycondensation of 2,4,6-trimethyl-1,3-phenylene diamine with a 70:30% (molar) mixture of isophthaloyl chloride and terephthaloyl chloride and the aromatic copolyamide prepared by the polycondensation of 1,3-phenylene diamine with a 70:30% (molar) mixture of isophthaloyl chloride and terephthaloyl chloride and 30% (weight, based on polymer) lithium nitrate in N,N-dimethylacetamide. Similar polymers are described in EPO 219,878.

The above polymer solution was extruded through a hollow fiber spinnerette with fiber channel dimensions of outer diameter (OD) equal to 33 mils ($8.4 \times 10^{-4}$ m) and inner diameter (ID) equal to 16 mils ($4.1 \times 10^{-4}$ m) at the rate of 173 cc per hour at 70° C. A solution of 56% (weight) N,N-dimethylacetamide in water was injected into the fiber bore at a rate of 20 cc per hour. The spun fiber passed through an air gap length of 7.0 cm at room temperature into a water coagulant bath maintained at 8° C. The fiber was wound up on a drum at the rate of 50 meters per minute.

The water-wet fiber was dehydrated as taught in U.S. Pat. No. 4,080,743; U.S. Pat. No. 4,080,744; U.S. Pat. No. 4,120,098; and EPO 219,878. This specifically involved the sequential replacement of water with methanol, the replacement of methanol with FREON ® 113 (1,1,2-trichloro-1,2,2-trifluoroethane), and drying in a vacuum of 20 inches (0.51 m) of mercury. The fibers were cut into lengths approximately 20 inches (0.51 m) long and the open ends of the fibers were potted in an epoxy resin within a ¼ inch (0.00635 m) diameter stainless steel tube to provide loops approximately 9 inches (0.23 m) long. From 10 to 24 fibers were so potted for the individual tests.

CONTROL EXAMPLE 1

An asymmetric polyamide hollow fiber membrane, prepared as described in Referential Example 1, was tested for pure gas helium and nitrogen permeabilities at 100 psig (689 kPa), 29° C. Results are reported below:

| He Productivity: | 145 GPU |
|---|---|
| He/N$_2$ Selectivity: | 1.9 |

The outer surfaces of the polyamide membrane were contacted with FREON ® 113 at room temperature for 0.25 hour. The FREON ® 113 was drained and the membrane was dried in a vacuum oven at 20 inches (0.51m) mercury at 50° C. ±10° C. overnight. The membrane was tested for pure gas helium and nitrogen permeabilities at 600 psig ($4.1 \times 10^6$ Pa), 24° C. Results are reported below:

$$GPU = 10^{-6} \times \frac{cm^3(STP)}{cm^2 - sec - (cmHg)}$$

CONTROL EXAMPLES 2-3

Asymmetric polyamide hollow fiber membranes, prepared as described in the Referential Example, were tested for pure gas helium and nitrogen permeabilities at 100 psig (689 kPa), 29° C. Results are reported in Table 1.

The outer surfaces of the polyamide membranes were contacted with solutions of ethyl acetate at the concentrations shown in Table 1 (weight) in FREON ® 113 at room temperature for 0.25 hour. The solutions were drained and the membranes dried in a vacuum at 20 inches (0.5 m) mercury at 60° C. ±10° C. overnight. The membranes were tested for pure gas helium and nitrogen permeabilities at 600 psig ($4.1 \times 10^6$ Pa), 24° C. Results are reported in Table 1.

TABLE 1

| Control Example | Preliminary PHe(GPU) | PHe/PN$_2$ | Treatment Mixture (wt %) | Treated PHe(GPU) | PHe/PN$_2$ |
|---|---|---|---|---|---|
| 1 | 220 | 1.6 | 1.0% Ethyl Acetate | 200 | 2.9 |
| 2 | 150 | 1.3 | 0.1% Ethyl Acetate | 135 | 5.1 |

EXAMPLES 1-12

Asymmetric polyamide hollow fiber membranes, prepared as described in the Referential Example, were tested for pure gas helium and nitrogen permeabilities at 100 psig (689 kPa), 29° C. Results are reported in Table 2.

The outer surfaces of the polyamide membranes were contacted with the surfactant mixtures listed in Table 2 in FREON ® 113 at the concentrations (weight, based on active agent) listed in Table 2 at room temperature for 0.25 hour. The mixtures were drained and the membranes dried in a vacuum oven at 20 inches (0.51 m) mercury at 60° C. ±10° C. overnight. The membranes were tested for pure gas helium and nitrogen permeabilities at 600 psig ($4.1 \times 10^6$ pa), 24° C. Results are reported in Table 1.

TABLE 2

| Example | Preliminary PHe(GPU) | PHe/PN$_2$ | Treatment Mixture (wt %) | Treated PHe(GPU) | PHe/PN$_2$ |
|---|---|---|---|---|---|
| 1 | 220 | 1.6 | 0.05% Surfactant A | 50 | 388 |
| 2 | 200 | 1.1 | 0.05% Surfactant A | 25 | 371 |
| 3 | 180 | 1.9 | 0.05% Surfactant A | 35 | 425 |
| 4 | 180 | 2.3 | 0.05% Surfactant A | 30 | 358 |
| 5 | 235 | 2.1 | 0.05% Surfactant A | 35 | 505 |
| 6 | 145 | 1.9 | 0.05% Surfactant A | 30 | 283 |
| 7 | 290 | 1.6 | 0.025% Surfactant A | 55 | 277 |
| 8 | 250 | 1.7 | 0.005% Surfactant B | 55 | 210 |
| 9 | 215 | 1.9 | 0.05% Surfactant B | 20 | 67 |
| 10 | 145 | 2.2 | 0.081% Surfactant C | 15 | 172 |
| 11 | 140 | 2.2 | 0.1% Surfactant D | 40 | 182 |
| 12 | 235 | 2.1 | 0.05% Surfactant E | 65 | 54 |

Surfactant A is a nonionic surfactant which is 50 wt % solution of a fluoroaliphatic polymeric ester in ethyl acetate. Surfactant B is a 25% aqueous solution of an anionic surfactant which is amine perfluoroalkyl sulfonates. Surfactant C. is 95% active ingredient liquid nonionic surfactant which is a mixture of fluorinated alkyl polyoxyethylene ethanols. Surfactant D is a 100% active ingredient nonionic surfactant which is a mixture of fluoroaliphatic polymeric esters. Surfactant E is a 50% solution of a mixture of fluoroaliphatic polymeric esters (a nonionic surfactant) in an aromatic naphtha boiling over the range 345° F to 425° F (174 C. to 218.C).

EXAMPLES 13-17

Asymmetric polyamide hollow fiber membranes, prepared as described in Referential Example 1, were tested for pure gas helium and nitrogen permeabilities at 100 psig (689 kPa), 29° C. Results are reported in Table 3.

The outer surfaces of the polyamide membranes were contacted with the surfactant mixtures listed in Table 3 in FREON ® 113 at the concentrations (weight, based on active agent) listed in Table 3 at room temperature for 0.25 hour. The mixtures were drained and the membranes dried in a vacuum oven at 20 inches (0.51 m) mercury at 60 C.±10° C. overnight. The membranes were tested for pure gas helium and nitrogen permeabilities at 600 psig (4.1×10$^6$ Pa), 24° C. Results are reported in Table 3.

TABLE 3

| | Preliminary | | | Treated | |
|---|---|---|---|---|---|
| Example | PHe(GPU) | PHe/PN$_2$ | Treatment Mixture (wt %) | PHe(GPU) | PHe/PN$_2$ |
| 13 | 180 | 1.4 | 0.1% Surfactant F | 35 | 326 |
| 14 | 180 | 2.1 | 0.047% Surfactant H | 40 | 282 |
| 15 | 255 | 1.9 | 0.035% Surfactant I | 70 | 38 |
| 16 | 200 | 2.0 | 0.0325% Surfactant J | 50 | 21 |
| 17 | 175 | 2.0 | 0.1% Surfactant K | 30 | 46 |

Surfactant F is a 100% active ingredient ethoxylated phosphate nonionic hydrocarbon surfactant. Surfactant H is an amphoteric fluorosurfactant supplied as a 47% solution in acetic acid which has the formula R$_f$CH$_2$CH(OCOCH$_3$)CH$_2$N$^+$ (CH$_3$)CH$_2$CO$_2^-$—where R$_f$ is a perfluoroalkyl group containing 6 to 16 carbon atoms.

Surfactant I is an anionic fluorosurfactant of the formula (R$_f$CH$_2$CH$_2$O)P(O)(ONH$_4$)$_2$ supplied as a 35% solution in a 45/20 water/isopropanol solution. Surfactant J is an anionic fluorosurfactant of the formula R$_f$CH$_2$CH$_2$SO$_3$X where X is a mixture of H and NH supplied as a 33% solution in 64/3 water/acetic acid solution. Surfactant K is a 100% active ingredient nonionic fluorosurfactant of the formula R$_f$CH$_2$CH$_2$O(CH$_2$CH$_2$O)$_y$H.

I claim:

1. A process for improving the permselectivity of a polyaramide gas separation membrane for at least one gas of a mixture of two or more gases comprising said membrane with a solution of an effective amount of an anionic, nonionic or amphoteric surfactant in a solvent, the solvent being capable of swelling the membrane but incapable of dissolving more than 3 weight percent of the membrane under conditions of contacting the membrane, the amount of surfactant being sufficient to provide at least a 10% improvement in the selectivity of the membrane with respect to helium over nitrogen over the selectivity achievable with the solvent alone.

2. The process of claim 1 wherein the polyaramide has the formula

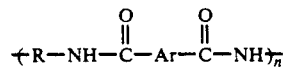

where —R— is

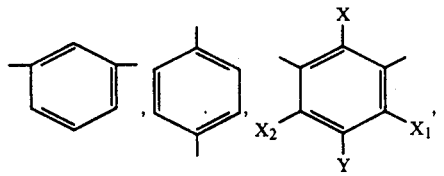

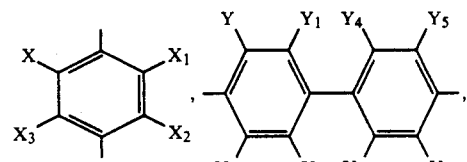

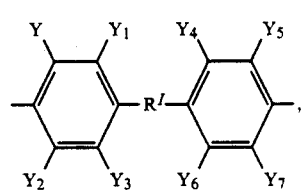

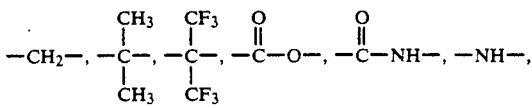

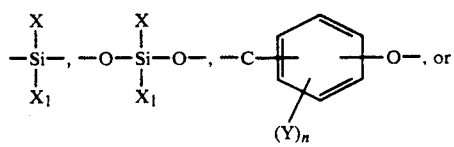

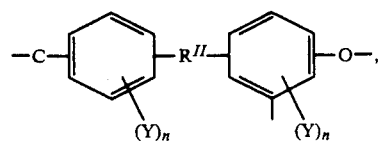

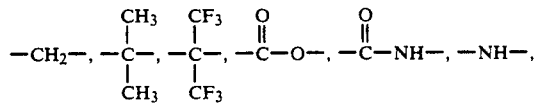

-continued

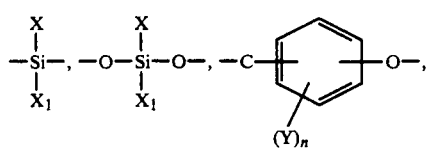

or mixtures thereof; —Ar— is

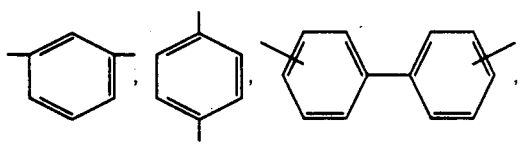

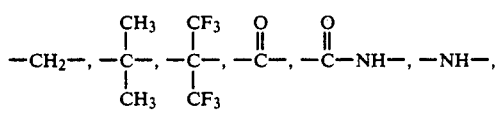

where —$R^{III}$— is —O—, —S—, —$\overset{O}{\underset{\|}{S}}$—, —$SO_2$—, —$\overset{O}{\underset{\|}{C}}$—, —$CH_2$—, —$\overset{CH_3}{\underset{CH_3}{\overset{|}{\underset{|}{C}}}}$—, —$\overset{CF_3}{\underset{CF_3}{\overset{|}{\underset{|}{C}}}}$—, —$\overset{O}{\underset{\|}{C}}$—, —$\overset{O}{\underset{\|}{C}}$—NH—, —NH—,

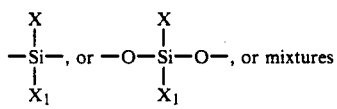, or mixtures thereof, and n is an integer such that the polymer is of film-forming molecular weight.

3. The process of claim 2 wherein the surfactant is present in the solvent in the range of 0.005 to 1.0 weight percent.

4. The process of claim 2 wherein the surfactant is dissolved in a non-polar liquid.

5. The process of claim 4 wherein the non-polar liquid is a chlorofluorocarbon.

6. The process of claim 5 wherein the polyamide has the formula

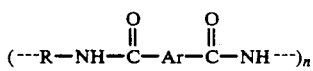

where —R— is

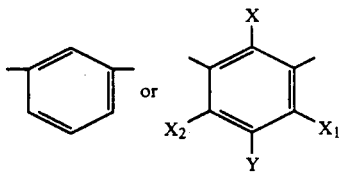

and —Ar— is 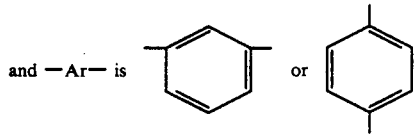

7. The process of claim 6 wherein the surfactant is nonionic fluorinated surfactant.

8. A gas separation membrane comprising a polyaramide posttreated with a solution of an effective amount of an anionic, nonionic or amphoteric surfactant in a solvent, the solvent being capable of swelling the membrane but incapable of dissolving more than 3 weight percent of the membrane under conditions of contacting the membrane, the amount of surfactant being sufficient to provide at least a 10% improvement in the selectivity of the membrane with respect to helium over nitrogen over the selectivity achievable with the solvent alone.

9. The gas separation membrane of claim 8 wherein the polyaramide has the formula

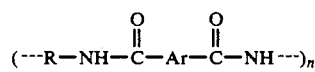

where —R— is

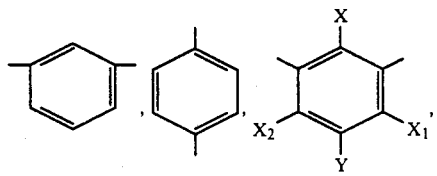

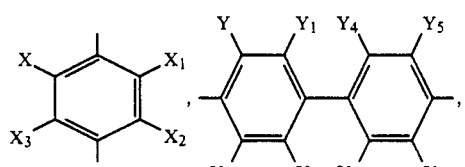

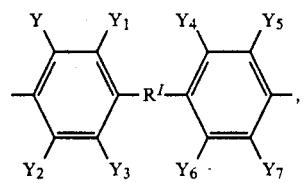

where —$R^I$— is —O—, —S—, —$\overset{O}{\underset{\|}{S}}$—, —$SO_2$—, —$\overset{O}{\underset{\|}{C}}$—, —$CH_2$—, —$\overset{CH_3}{\underset{CH_3}{\overset{|}{\underset{|}{C}}}}$—, —$\overset{CF_3}{\underset{CF_3}{\overset{|}{\underset{|}{C}}}}$—, —$\overset{O}{\underset{\|}{C}}$—O—, —$\overset{O}{\underset{\|}{C}}$—NH—, —NH—,

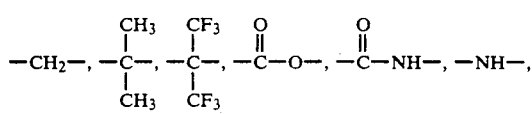, or

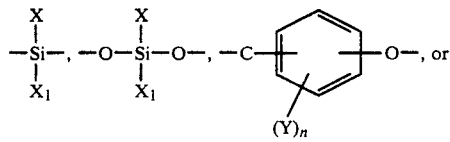

where —$R^{II}$— is —O—, —S—, —$\overset{O}{\underset{\|}{S}}$—, —$SO_2$—, —$\overset{O}{\underset{\|}{C}}$—, —$CH_2$—, —$\overset{CH_3}{\underset{CH_3}{\overset{|}{\underset{|}{C}}}}$—, —$\overset{CF_3}{\underset{CF_3}{\overset{|}{\underset{|}{C}}}}$—, —$\overset{O}{\underset{\|}{C}}$—O—, —$\overset{O}{\underset{\|}{C}}$—NH—, —NH—, -continued

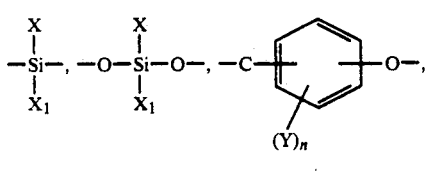

or mixtures thereof; —Ar— is

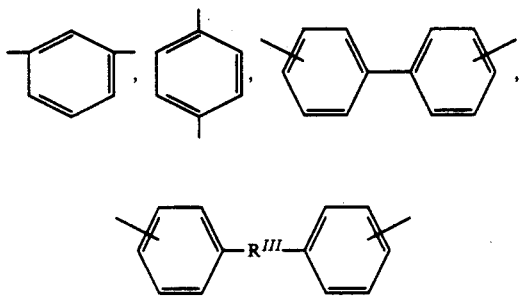

-continued

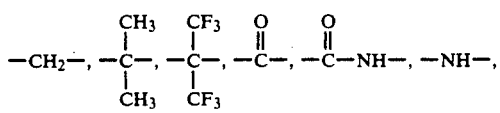

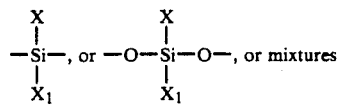

thereof, and n is an integer such that the polymer is of film-forming molecular weight.

10. A process of separating at least one component from a mixture of gases comprising bringing said gas mixture into contact with a feed side of the gas separation membrane of claim 8 in a manner to cause the component to permeate said membrane to a permeate side, the resulting gas mixture on the permeate side being enriched int he component over that of the mixture on the feed side.

* * * * *

UNITED STATES PATENT AND TRADEMARK OFFICE
CERTIFICATE OF CORRECTION

PATENT NO. : 5,032,149

DATED : July 16, 1991

INVENTOR(S) : Richard Allen Hayes

It is certified that error appears in the above-identified patent and that said Letters Patent is hereby corrected as shown below:

Column 5, line 19 and in Claim 2, column 10, line 50 and
in Claim 9, column 12, line 50:

delete "  " and substitute --  --.

column 5, line 24 and
in Claim 2, column 10, line 57, and
in Claim 9, column 12, line 57:

delete "  " and

UNITED STATES PATENT AND TRADEMARK OFFICE
CERTIFICATE OF CORRECTION

PATENT NO. : 5,032,149
DATED : July 16, 1991
INVENTOR(S) : Richard Allen Hayes

It is certified that error appears in the above-identified patent and that said Letters Patent is hereby corrected as shown below:

substitute --  --.

Column 5, line 37 and in Claim 2, column 11, line 3 <u>and</u> in Claim 9, column 13, line 3:

delete "  " and substitute -- 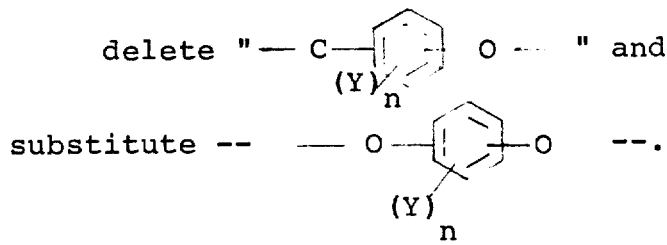 --.

Signed and Sealed this

Eighteenth Day of January, 1994

Attest:

BRUCE LEHMAN

Attesting Officer    Commissioner of Patents and Trademarks